United States Patent [19]

Jones

[11] 4,303,305
[45] Dec. 1, 1981

[54] REFLEX REFLECTOR DEVICE

[75] Inventor: Kenneth J. Jones, Sutton Coldfield, England

[73] Assignee: Lucas Industries Limited, Birmingham, England

[21] Appl. No.: 144,817

[22] Filed: Apr. 29, 1980

[30] Foreign Application Priority Data

Oct. 16, 1979 [GB] United Kingdom ............... 35911/79
Nov. 8, 1979 [GB] United Kingdom ............... 38779/79
May 4, 1980 [GB] United Kingdom ............... 15530/79

[51] Int. Cl.³ .............................................. G02B 5/124
[52] U.S. Cl. ........................................ 350/103; 404/14
[58] Field of Search ............... 296/316; 350/103, 105, 350/97, 67; 404/14–17; 301/37 SA

[56] References Cited

U.S. PATENT DOCUMENTS 3,355,341 11/1967 Bertsche ................................. 350/67
3,684,348 8/1972 Rowland .
3,712,706 1/1973 Stamm .
3,975,083 8/1976 Rowland ............................ 350/103

FOREIGN PATENT DOCUMENTS 998092 7/1965 United Kingdom .
2001451 1/1979 United Kingdom .

Primary Examiner—John K. Corbin
Assistant Examiner—B. W. de los Reyes
Attorney, Agent, or Firm—Ladas & Parry

[57] ABSTRACT

The reflectivity of a reflex reflector device comprising a reflex reflector element having corner cube reflecting elements on a rear surface thereof is improved, particularly at high entrance angles, by the provision of a second reflex reflector element behind the first reflex reflector element. The second reflex reflector element has corner cube reflecting elements which are on a rear surface thereof and which have a linear size five to ten times smaller than that of the corner cube reflecting elements of the first reflex reflector. Further improvements can be obtained if the corner cube reflecting elements of the second reflex reflector are angled relative to the front surface of the first reflex reflector.

11 Claims, 11 Drawing Figures

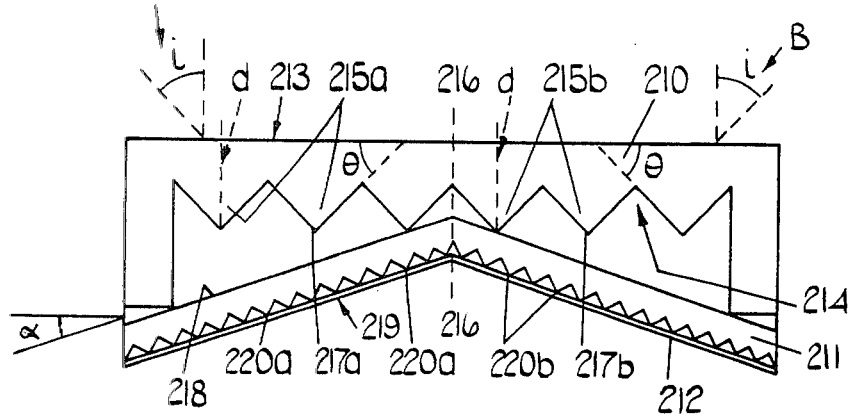
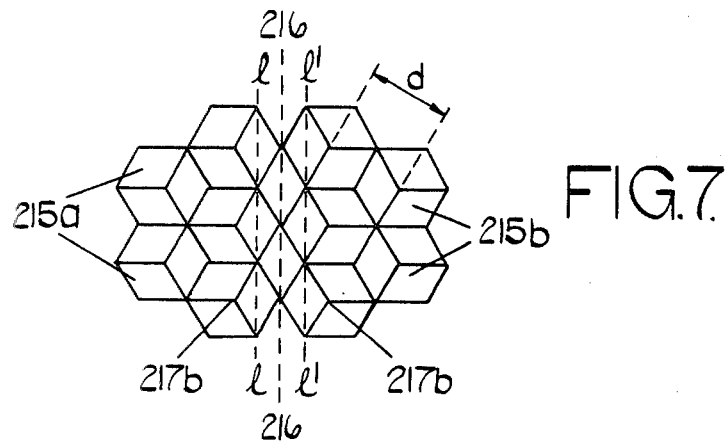
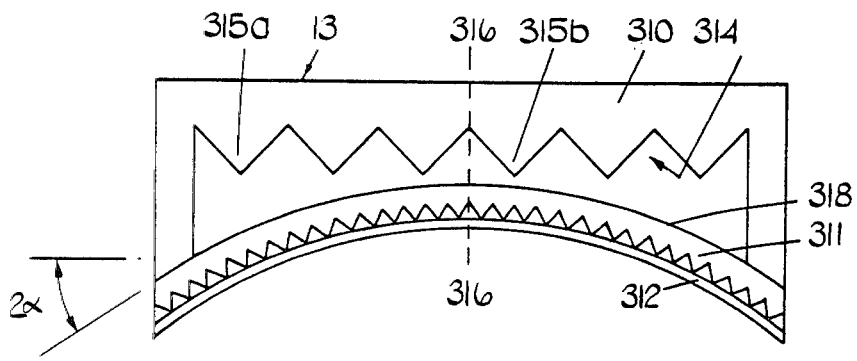

REFLEX REFLECTOR DEVICE

This invention relates to a reflex reflector device and is more particularly, though not exclusively, concerned with a reflex reflector device for use on a road vehicle.

Reflex reflector devices which are commonly used on motor vehicles comprise a plate which is moulded out of a transparent synthetic plastics material, a front surface of the plate being smooth and generally planar and a rear surface of the plate being formed by rows of cube corners. Such a reflex reflector device is commonly referred to as a corner cube reflex reflector and has the property that light which is incident upon the front surface of the plate and which is reflected by the rear surface of the plate emerges from the front surface in a direction substantially parallel to the incident light. A corner cube reflex reflector is most efficient where the entrance angle of incident light (i.e. the angle of the incident light with respect to a normal to the front surface of the plate) is small. In the case where the angle is 45°, the reflectivity of the reflex reflector is substantially zero. The above applies to the usual type of corner cube reflex reflector wherein the cube corner arrangement is such that the diagonals to the cube corners are perpendicular to the front surface of the plate. However, in certain other types of reflex reflector, the diagonals to the cube corners are disposed at an angle to the normal, i.e. the cube corners are tilted to obtain a higher reflectivity with high entrance angles in respect of light coming from a particular direction. With this latter form of construction, the reflectivity is reduced at narrower entrance angles in respect of incident light from other directions.

It is an object of the present invention to obviate or mitigate the above disadvantage by providing a reflex reflector device in which the reflectivity of the device at high entrance angles is improved.

According to the present invention, there is provided a reflex reflector device comprising a first corner cube reflex reflector in combination with a second corner cube reflex reflector, the second reflex reflector having corner cube reflecting elements which have a linear size less than that of corner cube reflecting elements of the first corner cube reflex reflector, and the second reflector being disposed behind the first reflector.

With the above form of construction, light incident upon the first reflex reflector which is not reflected internally of the first reflex reflector emerges from the rear face of the first reflex reflector at a shallower angle than the entrance angle of the incident light. Thus, the light incident upon the second reflex reflector is at a shallower entrance angle, with the result that the efficiency of total internal reflection in the second reflex reflector is higher than in the first. Light which has been reflected by the second reflex reflector is reflected back to the rear face of the first reflex reflector and, because of the relative sizes of the corner cube reflecting elements in the first and second reflex reflectors is most likely to enter the first reflex reflector through the same surface of the corner cube from which the light emerged. This beam of light then passes out through the front surface of the first reflex reflector after having been refracted in the usual way. Thus, light which would ordinarily have been lost through passage completely through the first reflex reflector is returned by the second reflex reflector with the result that the overall efficiency of the reflex reflector device is improved.

The efficiency of the reflex reflector device improves rapidly as the ratio of the linear size of the corner cube reflecting elements of the second reflector to that of the corner cube reflecting elements of the first reflector decreases to about 1:5 or 1:6. Below about 1:5 or 1:6 the efficiency is not noticeably improved. However, for ease of production it may be advantageous in certain cases to employ lower ratios e.g. 1:10.

The second reflex reflector may be a relatively rigid moulded element or may be a flexible plastics sheet. In one embodiment, the second reflex reflector is in the form of a flexible transparent plastics sheet having a backing sheet secured to a surface of the transparent plastics sheet at which the corner cube reflecting elements exist.

The first reflex reflector is preferably in the form of a rigid moulded plate having a rear recess, the corner cubes being provided over the base of the recess. In such a construction, the second reflex reflector may be disposed in the recess or may overlap the top of the recess and be secured to the first reflex reflector so as to act as a cover to prevent ingress of dirt, etc., into the recess.

It is preferred for the reflex reflector device to comprise a first reflex reflector having (1) a front surface and (2) a rear surface provided with a plurality of corner cubes, and a second reflex reflector disposed behind the first reflex reflector and having (1) a front surface and (2) a rear surface provided with a plurality of corner cubes which are (a) smaller than the corner cubes of the first reflex reflector, and (b) angled relative to the front surface of the first reflex reflector such that a light ray from a predetermined direction which is incident upon the front surface of the first reflex reflector and which passes through the first reflex reflector to enter the second reflex reflector is reflected by faces of one of the corner cubes thereof so as to return in a direction substantially parallel to that at which it entered the second reflex reflector.

Thus, the second reflex reflector is used at or near maximum efficiency with regard to this light ray so that optimum reflectivity is obtained.

If the light ray under consideration is normal to the front surface of the first reflex reflector (i.e. at 0° entrance angle) then, in the case where the said front surfaces are mutually parallel, each corner cube of the second reflex reflector should be arranged so that the diagonal thereof from the projecting cube corner is perpendicular to their front surfaces. In this case, the reflex reflector device is of the type disclosed in FIGS. 1 and 4 hereinafter. However, because of the high efficiency of the first reflex reflector at such an entrance angle, there is not much need for the second reflex reflector (see FIG. 5 hereinafter). It is only when higher entrance angles (upwards of 20°) are being considered, that much improved effects can be obtained by providing the second reflex reflector. Thus, at the higher entrance angles, substantial improvements can be obtained by arranging the aforesaid diagonal of each corner cube of the second reflex reflector to be non-perpendicularly disposed relative to the front surface of the first reflex reflector.

In one embodiment, a second reflex reflector is used in which the aforesaid diagonal of each corner cube is disposed perpendicularly to the front surface of the second reflex reflector but the whole of the second reflex reflector is inclined relative to the first reflex reflector in a direction and by an amount such that the light ray under consideration has a zero entrance angle with respect to the front surface of the second reflex reflector.

In the case where a light ray having an entrance angle i relative to the front surface of the first reflex reflector is concerned, the optimum results are obtained if the second reflex reflector is inclined so that its front surface is at an angle $\alpha$ relative to the front surface of the first reflex reflector, wherein $\alpha$ is calculated from the formula:

$$\sin 2\alpha = 1 - \tfrac{3}{8}(2\mu^2 - \sin^2 i - 2\sqrt{2} \sin i \sqrt{(\mu^2 - \sin^2 i)})$$

where $\mu$ = refractive index of the first reflex reflector,
i = the entrance angle of the light ray, However, in the case where i is other than 0°, improved results can be obtained where the angle of inclination of the second reflex reflector is greater than 0° and less than $\alpha$. The direction of inclination is such that parallel lines in the front surface of the second reflex reflector which are perpendicular of said direction of inclination are parallel to one of the diagonals of one set of faces of the corner cubes of the second reflex reflector.

In order to produce a useful improvement for entrance angles i in the range of 30°–50°, i.e. in a range in which the first reflex reflector alone is very inefficient, it is preferred to optimise the reflectivity for light rays at entrance angles i of about 40°. Thus, for example, when using a reflex reflector having a refractive index $\mu$ of 1.49, the angle $\alpha$ will be about 8°. It is of course possible to optimise for entrance angles i of 45° but this means a lower efficiency at entrance angles i of 30° and also that the reflex reflector device will be somewhat thicker because of the steeper angle of inclination of the second reflex reflector. However, the efficiency at angles greater than 45° will be improved and this may be of advantage in certain cases.

In another embodiment, the second reflex reflector described above is made of a suitably reflexible material and is bowed so that the front surface thereof is arcuately curved such that tangents to said surface have an average inclination of $\alpha$ in the direction specified above.

In a further embodiment, the front surface of the second reflex reflector is stepped with the treads (i.e. the portions presented towards the first reflex reflector) of the steps being inclined at said angle $\alpha$. Of course, improved effects can be obtained with the treads being inclined at an angle of between 0° and $\alpha$° exclusive. This construction enables the overall thickness of the device to be reduced. The "steps" may be defined by separate pieces which together form the second reflex reflector.

An improvement can be obtained, even when the said front surface are parallel, by inclining the corner cubes of the second reflex reflector. The inclination of the corner cubes, in this event, is dependent not only upon the entrance angle of the light ray considered and the refractive index of the first reflex reflector, but also upon the refractive index of the second reflex reflector.

In the accompanying drawings:

FIG. 6 is a schematic illustration of one embodiment of two integrally joined reflex reflector devices according to the present invention;

FIG. 7 is a plan view showing part of the corner cube arrangement in a first reflex reflector as shown in FIG. 6;

FIG. 8 is a schematic illustration, similar to FIG. 6 of another embodiment of two integrally joined reflex reflector devices according to the present invention;

Figure 1:
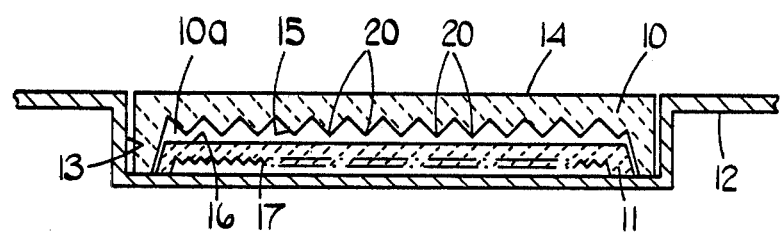
FIG. 1 is a schematic sectional view through one embodiment of reflex reflector device according to the present invention.

Referring now to FIG. 1 of the drawing, the reflex reflector device illustrated therein comprises a first corner cube reflex reflector 10, a second corner cube reflex reflector 11 disposed in a recess 10a in the rear of the reflector 10, and a support 12 having a recess 13 in which the reflectors 10 and 11 are fitted and sealed by ultrasonic welding or any other convenient securing operation. The first reflex reflector 10, in a common with conventional corner cube reflex reflectors, has a substantially planar front surface 14 and a rear surface 15 defining the base of the recess 10a. The surface 15 consists of a multiplicity of adjacent cube corners. In this embodiment, the diagonals to the cube corners extend perpendicularly relative to the substantially planar front surface 14.

Figure 2:
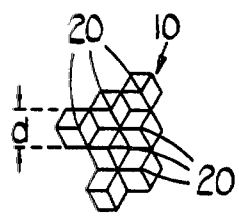
FIG. 2 is an underneath plan view of part of the rear surface of the first reflex reflector forming part of the device of FIG. 1.

Each cube corner has a linear size d as indicated in FIG. 2 where only a few adjacent cube corners are shown. The tip of each cube corner is indicated by the reference numeral 20 in FIGS. 1 and 2 and each cube corner has a hexagonal outline when the reflector 10 is viewed in plan. However, the adjacent sides in each hexagon are oppositely inclined in a plane perpendicular to the plane of FIG. 2. The dimension d represents the distance between opposite sides of the hexagonal outline of each cube corner.

Front and rear surfaces 16 and 17, respectively, of the second reflex reflector 10 are constructed in a similar manner to the front and rear surfaces 14 and 15 of the first reflex reflector 10 except that the linear size of the corner cubes of the surface 17 is one third of that of the corner cubes of the surface 15.

In this embodiment, the second reflex reflector 11 has its front surface 16 parallel to the front surface 14 of the first reflex reflector 10 and spaced away from the corner cubes of the rear surface 15. The spacing is not critical although, for space economy reasons, it is preferred to minimise the spacing in order to minimise the overall height of the reflex reflector device and to minimise the required size of the second reflector.

In this embodiment, both of the reflex reflectors 10 and 11 are relatively rigid and are moulded out of an acrylic resin having a refractive index of 1.49. The reflex reflector 10 is red coloured whilst the reflex reflector 11 is uncoloured.

Figure 3:
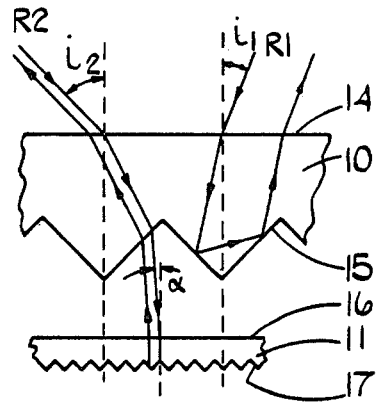
FIG. 3 is a diagram showing the optical effect of a reflex reflector according to the present invention.

Referring now to FIG. 3, on the right-hand side of this figure there is shown a ray of light R1 which is inclined at a relatively shallow angle $i_1$ to a normal to the surface 14. This light ray R1 is refracted upon entering the first reflex reflector 10 and most of it is internally reflected at least twice off one of the cube corners in the rear surface 15 before emerging from the front surface 14 in a direction parallel to the direction of the incident light ray R1.

In the case where a light ray R2 is incident upon the front surface 14 of the first reflex reflector 10 at a relatively large angle $i_2$ (e.g. 45°), most of the light ray is transmitted through the rear surface 15 to enter the air gap between the reflectors 10 and 11. With a conventional form of reflex reflector device consisting solely of the reflex reflector 10, this light ray R2 would be lost. However, because of the presence of the second reflex reflector 11, the light ray R2 enters the second reflex reflector 11 at a relatively narrow angle $\alpha$ so that a relatively large proportion of this light ray R2 is reflected and refracted back to enter the first reflex reflector 10 through the rear surface 15 thereof. This reflected and refracted light ray emerges out of the first reflex reflector through the front surface 14 thereof, thereby enhancing the reflecting efficiency of the reflex reflector device.

Figure 4:
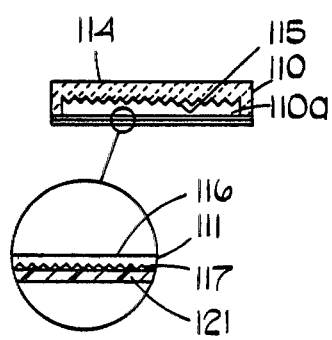
FIG. 4 is a sectional view through another embodiment of reflex reflector device according to the present invention.

Referring now to FIG. 4, the reflex reflector device illustrated therein consists of a first reflex reflector 110 and a second reflex reflector 111 secured to the back of the first reflex reflector 110. The first reflex reflector 110 has the same construction as the first reflex reflector 10 described with reference to FIGS. 1 and 2 in that it is provided with a rear recess 110a, a substantially planar front surface 114 and a rear surface 115 corresponding to the recess 10a, the front surface 14 and the rear surface 15, respectively. However, in this embodiment, the second reflex reflector 111 is formed of a flexible, clear plastics film having a rear surface 117 including a plurality of cube corners each having a triangular outline in plan view. The reflex reflector 111 is backed by a flexible, plastics backing film 121 secured to the rear surface 117 which, in this embodiment, is secured to the reflector 111 by ultrasonic welding. The second reflex reflector has a planar front surface 116 and is secured to the first reflex reflector 110 so as to act as a cover and to seal the recess 110a against ingress of moisture, dirt etc.

In this embodiment, the assembly of reflector 111 and backing film 121 may be conveniently formed by cutting it out of a continuous strip of large sheet of laminated clear plastics film and the backing film. In this embodiment, the ratio of linear size of the cube corners of the second reflex reflector 111 to that of the cube corners of the first reflex reflector 110 is approximately 1:10, the linear size d of the cube corners of the first reflex reflector being 0.94 inch. The linear size of the cube corners of the second reflex reflector is as measured across the base of the triangular outline thereof.

Figure 5:
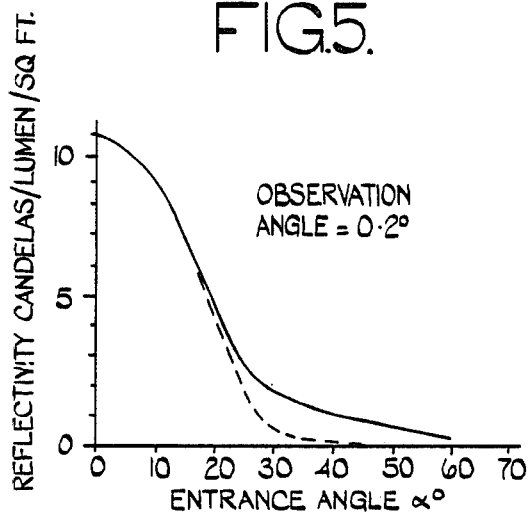
FIG. 5 is a typical graph in which reflectivity is plotted against entrance angle for a reflex reflector device of the type shown in FIG. 4 and a conventional reflex reflector.

Referring now to FIG. 5, there is shown a graph plotting reflectivity against entrance angle $\alpha$ for a light incident upon the surface 114. The curve shown in dotted line indicates the performance of the reflex reflector 110 alone (i.e. a conventional reflex reflector device) and the curve shown in full line represents the performance of a reflex reflector device consisting of the first and second reflectors 110 and 111 in combination. It will be seen from FIG. 5 that the reflectivity produced by a reflex reflector device comprising the reflectors 110 and 111 of FIG. 4 is greater at high entrance angles.

In the embodiment described with reference to FIG. 4 the reflectors 110 and 111 are secured together. However, the second reflector 111 may be mounted loosely between the first reflector 110 and a support similar to the support 12.

In the above described embodiments, the cube corners are disposed with their diagonals perpendicular to the front surface of the respective reflex reflector. However, the invention is applicable, mutatis mutandis, to reflex reflector constructions in which the diagonals of the cube corners are inclined with respect to the front surfaces of the reflectors.

The reflex reflector device according to the present invention is capable of being used in conjunction with a rear light of a road vehicle or a side marker light of a road vehicle. Because the device has a higher reflectivity at high entrance angles, it is rather more effective in use than a conventional single reflex reflector.

For example, the reflex reflector device according to the present invention may be used in conjunction with an electric lamp filament and a reflector which are disposed behind the reflex reflector device. In order to enable light from the filament and reflector to pass through the device, the extreme tips of some or all of the corner cubes of the first reflex reflector are removed or omitted so as to leave truncated corner cubes, as is usual with previously proposed assemblies in which a filament and a reflector are provided behind a corner cube reflex reflector element. However, since the device according to the present invention has a second reflex reflector through which light from the filament and reflector must pass, the second reflex reflector has areas thereon which permit direct transmission of light therethrough. Such areas are aligned with the truncated portions of the corner cubes of the first reflex reflector and may be formed by removing or omitting the corner cubes in such areas. In an alternative arrangement the corner cubes of the first reflex reflector are not truncated and light transmission areas are provided between adjacent corner cubes of the first reflex reflector with the corresponding areas of the second reflex reflector being aligned thereof.

Referring now to FIGS. 6 and 7 of the drawings, the two integrally joined reflex reflector devices basically comprise a common moulding 210 and a common film 211 backed by a common flexible plastics backing film 212. The moulding 210 is formed of a transparent, acrylic resin having a refractive index of 1.49 in this embodiment. The front surface 213 of the moulding 210 is substantially planar although it may have a slight convex curvature. The rear surface 214 of the moulding 210 is defined by a multiplicity of cube corners arranged in two sets 215a and 215b each set being associated with one of the devices. FIG. 6 only shows a relatively small number of these cube corners 215a and 215b for the sake of clarity and the moulding 210 has been shown as having a much smaller longitudinal extent than it actually has. The sets of cube corners 215a and 215b are disposed on opposite sides of the central plane 216—216 which extends perpendicularly with respect to the longitudinal dimension of the moulding 210 which is rectangular. Thus, the two devices are disposed on opposite sides of the plane 216—216. As can be seen particularly from FIG. 7, the cube corners 215a and 215b are arranged in rows in their respective sets with one face of each cube corner 215a and 215b facing the plane 216—216 each row extending perpendicularly to the longitudinal dimension of the moulding 210. The cube corners 215a are thus angularly displaced by 60° relative to the angular orientation of the cube corners 215b. The faces of the cube corners 215a and 215b are disposed at an angle θ of about 55° to the plane of the front surface 213. The tip (i.e. the projecting cube corner) of each cube corner 215a, 215b is indicated by reference numerals 217a and 217b respectively. The diagonal d form each tip 217a, 217b across the cube corner 215a, 215b is perpendicular to the front surface 213.

The common film 211 is basically of an inverted V-shape in longitudinal section with the plane 216—216 intersecting the apex of the V. The common backing film 212 is of the same V-shape. The front surface 218, i.e. the surface facing the cube corners 215a and 215b of the film 211 at each side of the plane 216—216 is planar. The rear surface 219 of the backing film 212 is formed with a multiplicity of cube corners 219a and 219b. The mutual arrangement and disposition of the cube corners 220a and 220b is the same as that described above for the cube corners 215a and 215b. However the ratio of the linear sides of the cube corners 220a and 220b to that of the cube corners 215a and 215b is approximately 1:10, the linear size d (see FIG. 2) of each corner 215a, 215b being 0.094 of an inch in this embodiment. The film 211 on each side of the plane 216 is inclined at an angle α to the front surface 213 of the moulding 210. Of course, the portions of the film 211 on either side of the plane 216 are inclined in the opposite sense. In this embodiment, the angle α is about 8° for optimising efficiency at an entrance angle i of about 40°. The angle α is calculated from the following formula:

$$\sin 2\alpha = 1 - \tfrac{3}{8}(2\mu^2 - \sin^2 i - 2\sqrt{2} \sin i\sqrt{(\mu^2 - \sin^2 i)})$$

where
i = the entrance angle and
μ = the refractive index of the material of construction of the moulding 10.

As will be appreciated from FIGS. 1 and 2, the direction of inclination of the film 211 on each side of the plane 216 is such that parallel lines in the front surface 218 which are perpendicular to the direction of inclination are parallel to the diagonals extending in the direction 1—1 or 1'—1' of said one face of the corner cubes 215a or 215b which face the central plane 216—216.

The device to the left-hand side of the plane 216—216 as viewed in FIGS. 1 and 2 has improved reflectivity from the side indicated by arrow A in FIG. 1 whilst the device to the right-hand side of the plane 216—216 has improved reflectivity from the side indicated by arrow B in FIG. 1. Naturally, if the light is incident upon the surface 213 at or near 90° to the front surface 213 (i.e. entrance angle i = ~0°) an extremely efficient reflection is produced merely by the moulding 210 since the efficiency of reflection from the cube corners 215a and 215b alone is very high. However, the greater the entrance angle i, the greater the losses through passage of light completely through the moulding 210. Thus, to increase the reflectivity of the film 211 to an optimum, the light incident upon the surface 218 should be as near as possible at 90° to the latter surface. By arranging the angle of inclination α in accordance with the aforementioned formula for a particular entrance angle i, this effect is obtained. It should be explained that the devices are intended to be fitted onto a motor vehicle with the longitudinal dimensions of the device extending horizontally. Efficient reflection is thus obtained with incident light anywhere within a wide horizontal arc. Efficiency of reflection is not so important in a vertical arc because of the intended use of the device on a motor vehicle. It is to be appreciated that efficiency at high entrance angles in the vertical direction is not particularly important as the spread of reflected light in a vertical plane is not required to be very great in order to be visible to other road users.

Turning now to the embodiment of FIG. 8 the devices illustrated therein are very similar to the devices of FIGS. 6 and 7. In fact, the devices of FIG. 8 use a moulding 310 which is the same as the moulding 10 used in the embodiment of FIGS. 1 and 2. However, in place of the film 11 which is of V-shaped longitudinal section, an arcuately curved film 311 is employed which is backed by a correspondingly arcuate curved backing film 312. In effect, the curve of the film 311 simulates the V-shape of the film 211. The curve of the film 311 is such that a tangent to front surface 318 at plane 316—316 lies at an angle of 0° relative to the plane of the front surface 313, i.e. the tangent is parallel to the front surface 313. At the extremities of the film 311 at each end of the moulding 310 the tangent to the surface 318 lies at an angle 2α. Thus, the average angle of tangents to the surface 318 is α, where α is calculated in accordance with the above-mentioned formula.

Figure 9:
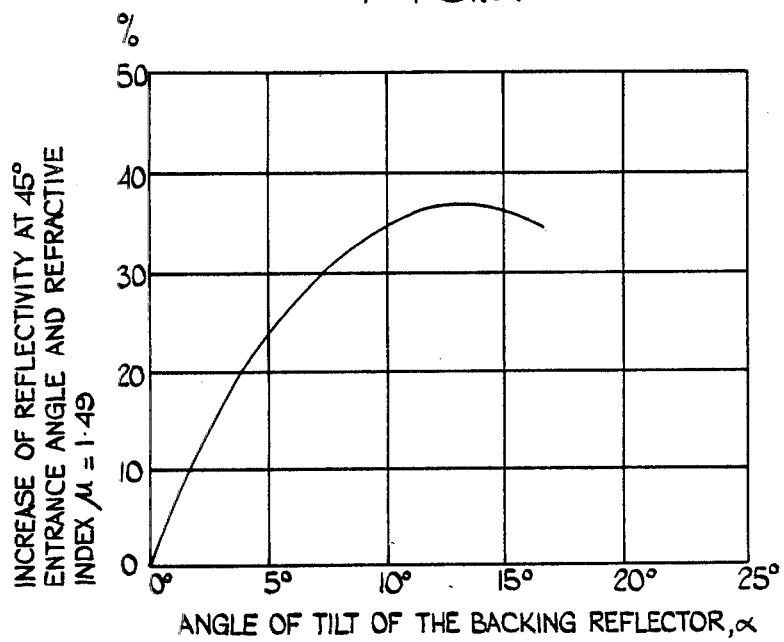
FIG. 9 is a graph showing the increase in reflectivity at a 45° entrance angle with angle of tilt of a second reflex reflector forming part of the reflex reflector device of FIG. 6.

Referring now to FIG. 9 the graph illustrated therein shows the change in reflectivity at an entrance angle i of 45° as the angle α changes. As can be seen from the graph, the best results for i = 45° would be obtained in the angle α were about 13°. It is to be noted that this graph relates to the embodiment of FIG. 6 where the refractive index of the moulding is 1.49. However, since the angle α actually chosen is 8° for the reasons previously mentioned, optimum reflectivity results are not obtained for rays at a 45° entrance angle i. Nevertheless, the graph demonstrates that a very useful increase is obtained at i = 45° even when angle α is 8°.

In the above-described embodiments, the film 211, 311 is bent such that it slopes back from the plane 216—216 or 316—316 i.e. such that the portion of the film 211, 311 which lies in said plane is nearest to the moulding 210, 310. However, it is to be appreciated that, mutatis mutandis, the film 211, 311 may be bent in the opposite direction so that the portion thereof which lies in the plane 216—216 or 316—316 is furthest from the moulding 210, 310 in which case, the orientation of the corner cubes 215a, 315a and 215b and 315b will be reversed. Also, in the above-described embodiments, the portions of the film 211, 311 on opposite sides of the plane 216—216, 316—316 are integral with one another. However, in a modification, these portions are not integral but separately formed items.

Figure 10:
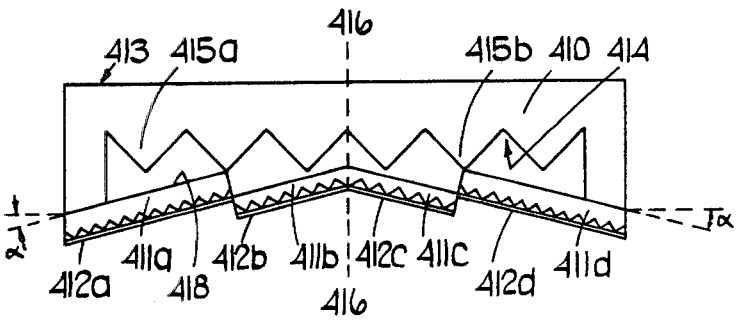
FIG. 10 is a schematic illustration, similar to FIG. 6 of a further embodiment.

Referring now to FIG. 10 the embodiment illustrated therein is very similar to that of FIG. 6 with the exception that the continuous film 211 is replaced by four separate film portions 411a, 411b, 411c, and 411d each of which is inclined at angle α as calculated previously. The film portions 411a and 411b are mutually stepped as are the film portions 411c and 411d. It will be appreciated that this form of device is thinner for a given angle α than the device of FIG. 6. If desired, more than two separate portions may be provided on each side of plane 416—416. Each portion 421a-411d has its own backing film 412a-412d respectively. If desired, the portions 411a to 411d may be integrally formed in a single moulding.

Figure 11:
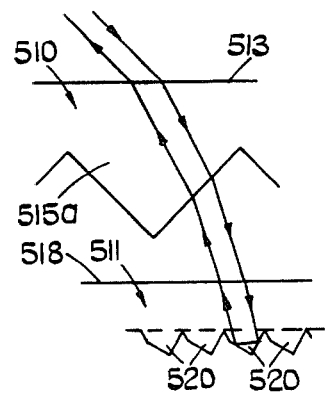
FIG. 11 is a schematic illustration of part of a still further embodiment of reflex reflector device according to the present invention.

Referring now to FIG. 11, only part of the device is shown and comprises moulding 510 which is identical to the moulding 210 described with reference to FIGS. 6 and 7. In this embodiment, the device includes a film 511 having a front surface 518 which is parallel to the front surface 513 of the moulding 510. The film 511 has a refractive index of 1.49 i.e. the same as that of the moulding 510. However, in this embodiment, the rear surface of the film 513 is defined by corner cubes 520 which are tilted instead of their diagonals being perpendicular with respect to the front surface 518. The angle of tilt relative to the perpendicular of each corner cube 520 is about 5° for $\mu = 1.49$ The effect of this is to ensure that a ray of light which comes from a specific direction and is incident upon the surface 13 at an angle i equal to 40° and which passes through the moulding 510 without being reflected by one of the corner cubes 515a is incident upon the surface 518 at an angle of about 8° but is incident upon the corner cube 520 parallel to its axis so that the full "corner cube reflex effect" is obtained. Of course, the direction of tilt or inclination of the corner cubes 520 is the same as that described with reference to the inclination of the front surface 218 in the embodiment of FIG. 6. In FIG. 11 only those corner cubes 520 which are associated with the cube corners corresponding to cube corners 15a are shown and similar though oppositely tilted corner cubes 520 will be provided in the film 513 in association with the corner cubes corresponding to the cube corners 15b.

Although the orientation of the cube corners of the second or rear reflux reflector is not critical, it is preferred to orientate them so as to obtain the maximum optical effect.

I claim:

1. A reflex reflector device comprising a first reflex reflector having (1) a front surface, and (2) a rear surface provided with a plurality of corner cube reflecting elements, and a second reflex reflector disposed behind said first reflex reflector, said second reflex reflector having (1) a front surface and (2) a rear surface provided with a plurality of corner cube reflecting elements which have a linear size less than that of said corner cube reflecting elements of said first reflex reflector, said front surface of said second reflex reflector being disposed between said corner cube reflecting elements of said rear surfaces of said first and second reflex reflectors, whereby a light ray from a predetermined direction which is incident upon said front surface of said first reflex reflector and which passes through said first reflex reflector to enter said second reflex reflector via said front surface thereof is reflected by faces of one of said corner cube reflecting elements of said second reflex reflector so as to return in a direction substantially parallel to that at which it entered said second reflex reflector.

2. A reflex reflector device comprising a first reflex reflector having (1) a front surface and (2) a rear surface provided with a plurality of corner cubes, and a second reflex reflector disposed behind said first reflex reflector and having (1) a front surface and (2) a rear surface provided with a plurality of corner cubes which are (a) smaller than said corner cubes of said first reflex reflector, and (b) angled relative to said front surface of said first reflex reflector such that a light ray from a predetermined direction which is incident upon said front surface of said first reflex reflection and which passes through said first reflex reflector to enter said second reflex reflector is reflected by faces of one of said corner cubes thereof so as to return in a direction substantially parallel to that at which it entered said second reflex reflector.

3. A device as claimed in claim 1 or 2, wherein the ratio of the linear size of said corner cube reflecting elements of said second reflector to that of said corner cube reflecting elements of said first reflector is 1:5 to 1:10.

4. A device as claimed in claim 2, wherein the second reflex reflector is disposed so that its front surface is inclined at an acute angle $\alpha$ other than zero relative to the front surface of the first reflex reflector, and wherein the diagonal of each corner cube of the second reflex reflector is perpendicular to the front surface of the second reflex reflector.

5. A device as claimed in claim 4, wherein $\alpha$ is not greater than the value calculated from the formula:

$$\sin 2\alpha = 1 - \tfrac{2}{3}(2\mu^2 - \sin^2 i - 2\sqrt{2} \sin \sqrt{\mu^2 - \sin^2 i})$$

where $\mu$ = the refractive index of the first reflex reflector, and i = the entrance angle of the light ray.

6. A device as claimed in claim 5, wherein $\alpha$ is equal to the value calculated from said formula.

7. A device as claimed in claim 5, wherein i is in the range of 30°–50°.

8. A device as claimed in claim 7, wherein i is about 40°.

9. A device as claimed in claim 4, wherein the second reflex reflector is bowed so that the front surface thereof is arcuately curved such that tangents to the curve have an average inclination of $\alpha$.

10. A device as claimed in claim 4, wherein the front surface of the second reflex reflector is stepped with the treads of the steps being inclined at said angle $\alpha$.

11. A device as claimed in claim 1 or 2, wherein said front surfaces are substantially parallel, the diagonals of the cube corner reflecting elements are non-perpendicularly disposed relative to the front surface of the second reflex reflector.

* * * * *